United States Patent
Clifton et al.

(10) Patent No.: US 11,740,831 B2
(45) Date of Patent: Aug. 29, 2023

(54) STORAGE OPTIMIZATION FOR EVENT STREAMING FOR MULTIPLE CONSUMERS

(71) Applicant: INTERNATIONAL BUSINESS MACHINES CORPORATION, Armonk, NY (US)

(72) Inventors: John Mark Clifton, Hertford (GB); Jack Philip Boad, Rainham (GB); David Jonathan Richards, Romsey (GB); Callum Peter Jackson, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 17/454,494

(22) Filed: Nov. 11, 2021

(65) Prior Publication Data

US 2023/0143076 A1    May 11, 2023

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/067; G06F 3/0604; G06F 3/0655
See application file for complete search history.

(56) References Cited

U.S. PATENT DOCUMENTS

| | | | |
|---|---|---|---|
| 5,737,747 A * | 4/1998 | Vishlitzky | G06F 12/0866 348/E7.071 |
| 7,359,890 B1 * | 4/2008 | Ku | G06F 16/24552 |
| 10,037,285 B2 | 7/2018 | Ramachandran | |
| 10,754,549 B2 | 8/2020 | Matthew | |
| 10,944,807 B2 | 3/2021 | Paduroiu | |
| 2001/0003194 A1 * | 6/2001 | Shimura | G06F 16/9574 719/310 |
| 2015/0301757 A1 * | 10/2015 | Iwata | G06F 3/068 711/114 |
| 2018/0352269 A1 * | 12/2018 | Patil | H04N 21/8456 |
| 2019/0243771 A1 | 8/2019 | Mittal | |

FOREIGN PATENT DOCUMENTS

CN    112799597 A    5/2021

OTHER PUBLICATIONS

IBM, "Advanced Technology Group",https://www.ibm.com/support/pages/node/1125513?lang=en, accessed Nov. 11, 2021, pp. 1-4.
Mell et al., "The NIST Definition of Cloud Computing", National Institute of Standards and Technology, Special Publication 800-145, Sep. 2011, pp. 1-7.

* cited by examiner

*Primary Examiner* — Michelle T Bechtold
(74) *Attorney, Agent, or Firm* — Kristofer Haggerty

(57) ABSTRACT

Method and system are provided for storage optimization for event streaming for multiple consumers. The method provides an entire event stream for storage in a first tier storage and dynamically determines advance portions of the event stream for at least some of the consumers based on a consumer's position index in the event stream. The advance portions are portions of the event stream that will be consumed next by the consumer and the method provides the advance portions of the event stream for storage in second tier storage that has a higher performance than the first tier storage.

13 Claims, 7 Drawing Sheets

STORAGE OPTIMIZATION FOR EVENT STREAMING FOR MULTIPLE CONSUMERS

BACKGROUND

The present invention relates to storage optimization, and more specifically, to storage optimization for event streaming for multiple consumers.

Event streaming technologies provide the ability to store a single copy of events, and allows simultaneous access to multiple consumers. Such event streaming technologies provide a distributed streaming platform that is used for building real-time data pipelines and streaming applications.

Event streaming technologies provide the advantage of being able to scale the number of consumers without significant impact to the storage requirements. This is achieved by assigning a consumer a specific pointer into the stream. This allows two consumers to be at different positions within the stream, while maintaining a single copy of the data.

New consumers can subscribe to the stream and should have access to the complete stream history, not only the events after the subscription. This commonly means a large storage requirement for a stream, as it has to include the entire stream history (or at least a configured retention period or size). Often this means that the stream history is stored on traditional hard disk drives (HDD). These are cheap to purchase; however, they can have undesirable performance characteristics. The alternative is to store the stream on solid-state drives (SSD). This can significantly improve the performance; however, it may also increase the associated cost of the solution.

The traditional SSD cache solution stores commonly accessed data on SSD so future access can benefit from improved performance compared to the HDD.

Tier adjusting storage mechanisms are known, which respond to the presence of SSD in a storage pool that also contains HDDs. The system automatically and non-disruptively moves frequently accessed data from HDD managed disks to flash-based storage SSD managed disks, thus placing such data in a faster tier of storage.

SUMMARY

According to an aspect of the present invention there is provided a computer-implemented method for storage optimization for event streaming for multiple consumers, comprising: providing an entire event stream for storage in a first tier storage; dynamically determining advance portions of the event stream for at least some of the consumers based on a consumer's position index in the event stream, wherein advance portions are portions of the event stream that will be consumed next by the consumer; and providing the dynamically determined advance portions of the event stream for storage in a second tier storage that has a higher performance than the first tier storage.

According to another aspect of the present invention there is provided a system for storage optimization for event streaming for multiple consumers, comprising: a processor and a memory configured to provide computer program instructions to the processor to execute the function of the components: a first tier storage component for providing an entire event stream for storage in a first tier storage; an advance portion determining component for dynamically determining advance portions of the event stream for at least some of the consumers based on a consumer's position index in the event stream, wherein advance portions are portions of the event stream that will be consumed next by the consumer; and a second tier storage component for providing the dynamically determined advance portions of the event stream for storage in second tier storage that has a higher performance than the first tier storage.

According to a further aspect of the present invention there is provided a computer program product for storage optimization for event streaming for multiple consumers, the computer program product comprising a computer readable storage medium having program instructions embodied therewith, the program instructions executable by a processor to cause the processor to: provide an entire event stream for storage in a first tier storage; dynamically determine advance portions of the event stream for at least some of the consumers based on a consumer's position index in the event stream, wherein advance portions are portions of the event stream that will be consumed next by the consumer; and provide the dynamically determined advance portions of the event stream for storage in second tier storage that has a higher performance than the first tier storage.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
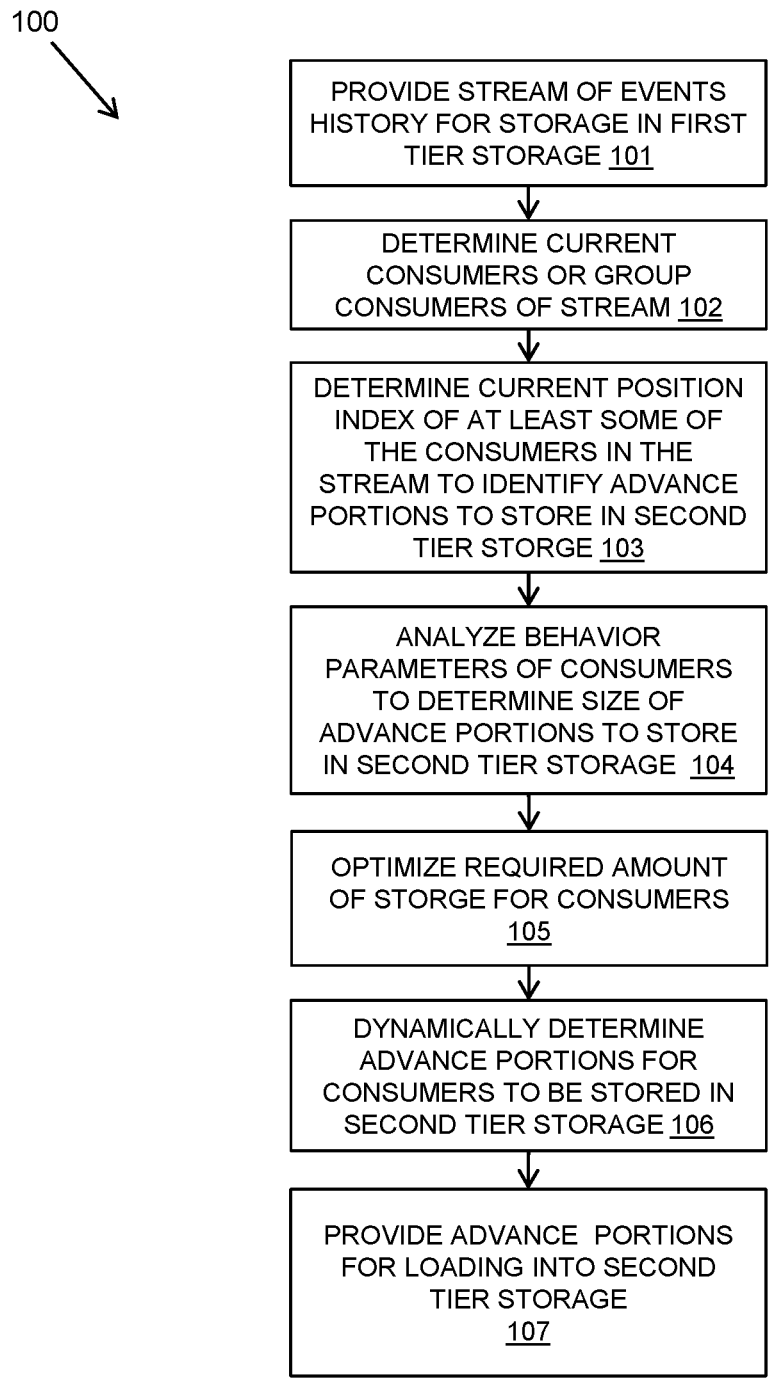
FIG. 1 is a flow diagram of an example embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for reducing the cost of high-performance event streaming, by using a mixture of a first tier of storage of cost-effective storage and a second tier of storage with a higher performance. The second tier of storage is used for data that is predicted to be accessed in the near future by consumers.

In the described method and system, the first tier of storage is used to store the entire event stream history and the second tier of storage is used to store the data that is going to be accessed in the near future by all or a group of consumers. This provides high performance for existing consumers, whilst providing access to the retained stream history for new consumers. The data that is going to be accessed in the near future is referred to as the advance data and is based on the current location in the event stream of a consumer.

The advance data is dynamically loaded on the second storage tier and may be intelligently selected based on the understanding of how consumers work with event streaming technologies. This significantly improves the access time for consumers, while only requiring a fraction of the event stream history to be stored on the second, more expensive, storage tier.

With event streaming systems, it is less about reading one bit of data lots of times and more about a set of consumers making their own way through the stream of data that is coming in. Due to the operation of event streaming systems, they track where every consumer is up to and therefore it is possible to determine what portion of the event stream will be looked at next.

Event streaming provides a growing, ordered set of distinct event objects that a set of consumers typically work forward through, with each consumer potentially starting in a different place and moving at a different speed. An event may, for example, be something like 'doorbell rang', 'transaction processed,' 'sensor triggered' with each event having additional information that the consumers can act upon. An event stream may be other forms of stream of media with multiple consumers acting at different speeds and reading forwards.

The described method analyzes consumers' behavior in relation to an event stream to determine the current location of consumers and their behavior parameters and patterns. Behavior parameters may include, for example, how fast they are moving through events, or wherein in the stream a consumer is in relation to other consumers. The consumer behavior is used to analyze the size of the portion of the event stream that would be optimal to load in the second tier storage. The consumer behavior may be analyzed for each consumer or a group of consumers to optimize the amount of storage in the second tier storage.

Tier adjusting storage mechanisms are provided in some storage products. Storage systems typically have different tiers of storage where each tier has a different ratio of cost to performance. Tier adjusting storage mechanisms typically put the data that is accessed most often on the fastest storage. This provides something approaching the performance of having only the most expensive storage but with only a fraction actually being this expensive storage and the rest being much cheaper. In a dynamically tiered environment, data movement is seamless to the host application regardless of the storage tier in which the data belongs.

In the described method and system, tier adjusting storage mechanism are augmented based on how customers typically consume data in the event stream. The determined advance portions of the event stream for consumers are loaded in second tier storage. The advance portions required by consumers may be scored, with the highest scoring data loaded to the second tier storage.

In this description, the first tier of storage is provided by hard disk drives (HDD) and the second tier of storage is provided by solid-state drives (SSD). It will be appreciated that other types of storage may be used in the tiers.

Referring to FIG. 1, a flow diagram 100 shows an example embodiment of the described method. An event stream may be provided 101 to be stored is a first storage tier, such as HDD storage. The entire stream history may be stored in the first storage tier.

The method may dynamically determine 102 the current consumers or a group of consumers of the event stream. Group analysis may be used for a representative proportion of consumers or a group for which it is determined that optimization is required.

The method may determine 103 current position indexes of at least some of the consumers in the event stream, for example, all consumers of a group to be optimized, in order to identify advance portions to be stored in the second tier storage. The position indexes are used to determine the start of the advance portions of the event stream that are candidates to be stored in the second tier storage.

The amount of second tier storage allocated to each consumer may be an equal amount per consumer. For example, this may be based on one or more of: a static allocated size of the storage per consumer; a static allocated number of events per consumer; a dynamic allocated size of the storage per consumer depending on the number of consumers, and a dynamic allocated number of events per consumer based on the number of consumers.

Optionally, the behavior of the consumers is analyzed 104 by considering behavior parameters or patterns so that the volume of future events per consumer to be stored in second tier storage takes the behavior of consumers into account. Such parameters may include, for example, the speed the consumer is processing events or the number of events a consumer is behind the head of the event stream. The number of consumers that need access to that data in the future may also be taken into consideration.

The method may optimize 105 the amount of second tier storage for at least some of the consumers, based on the number of consumers to be optimized and, optionally, based on the consumer behavior.

Using the position index and the optimized amount of second tier storage for a consumer, the method may dynamically determine 106 the advance event stream portions to be stored on the second tier storage. Each advance portion for a consumer may be scored and the highest scoring portions may be selected for storage on the second tier storage. This also takes into account overlaps of the advance event stream portions across the consumers as a portion effectively get scored multiple times (once for each consumer) so there is a tendency to select data that multiple consumers want to access.

These determined portions may be provided 107 for loading into the second tier storage, for example, using tier adjusting storage mechanisms. In this way, the volume of the advance events per consumer may vary, and is calculated based on the consumer position and, optionally, behavior.

Known tier adjusting storage demonstrates that smart placement of data on SSDs can drive very significant performance improvements over HDD without anything like the cost of a full SSD implementation. The described method predicts the data that is to be read next so that it can be placed on the SSDs.

The described method and system provide integration between the event stream and storage subsystem so optimization of the stream storage can occur between different tiers of cost-to-performance storage.

Figure 2A:
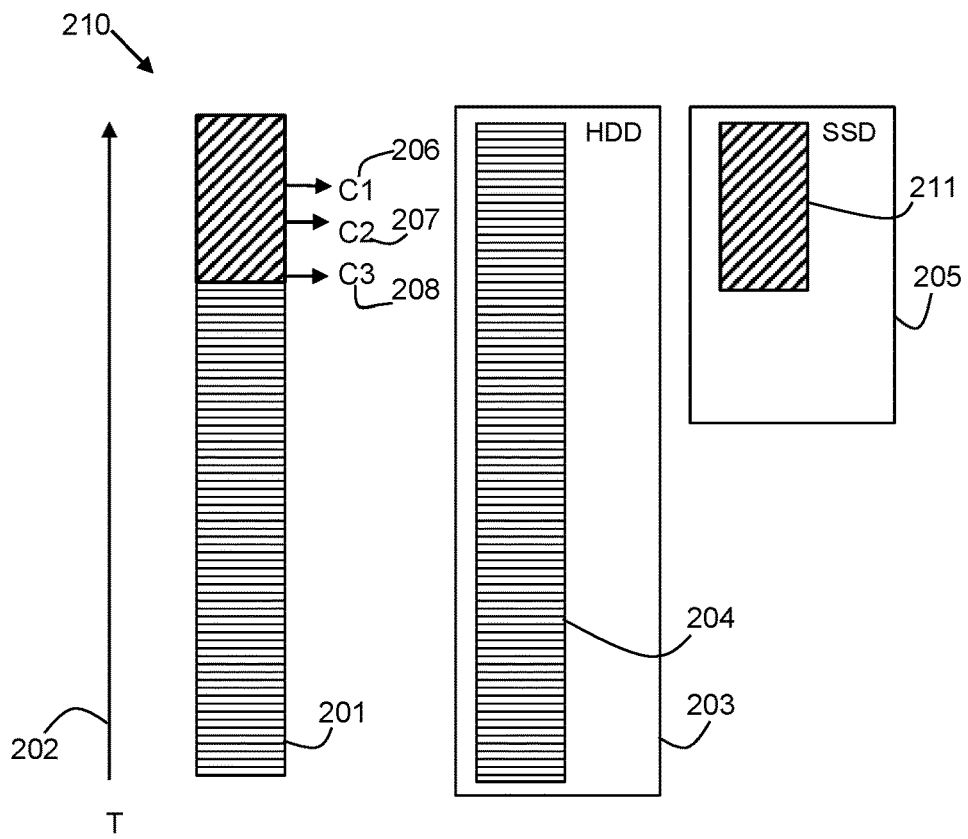
FIGS. 2A to 2C are a schematic diagrams of example embodiments of the method in accordance with the present invention.
Figure 2B:
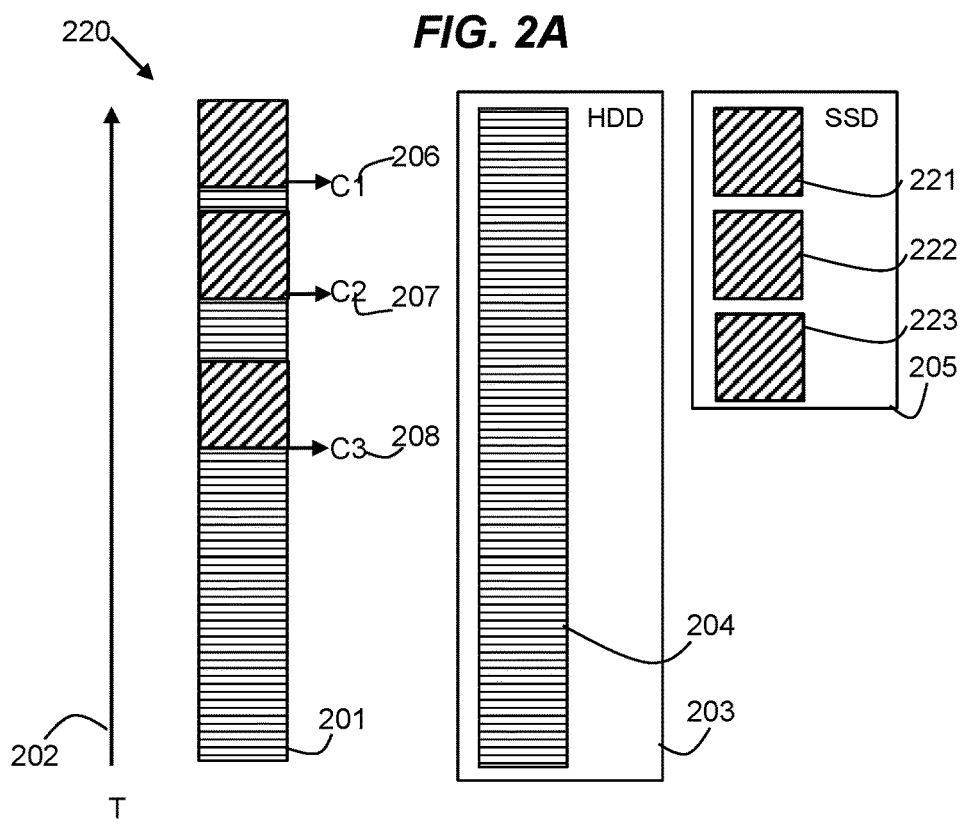
Figure 2C:
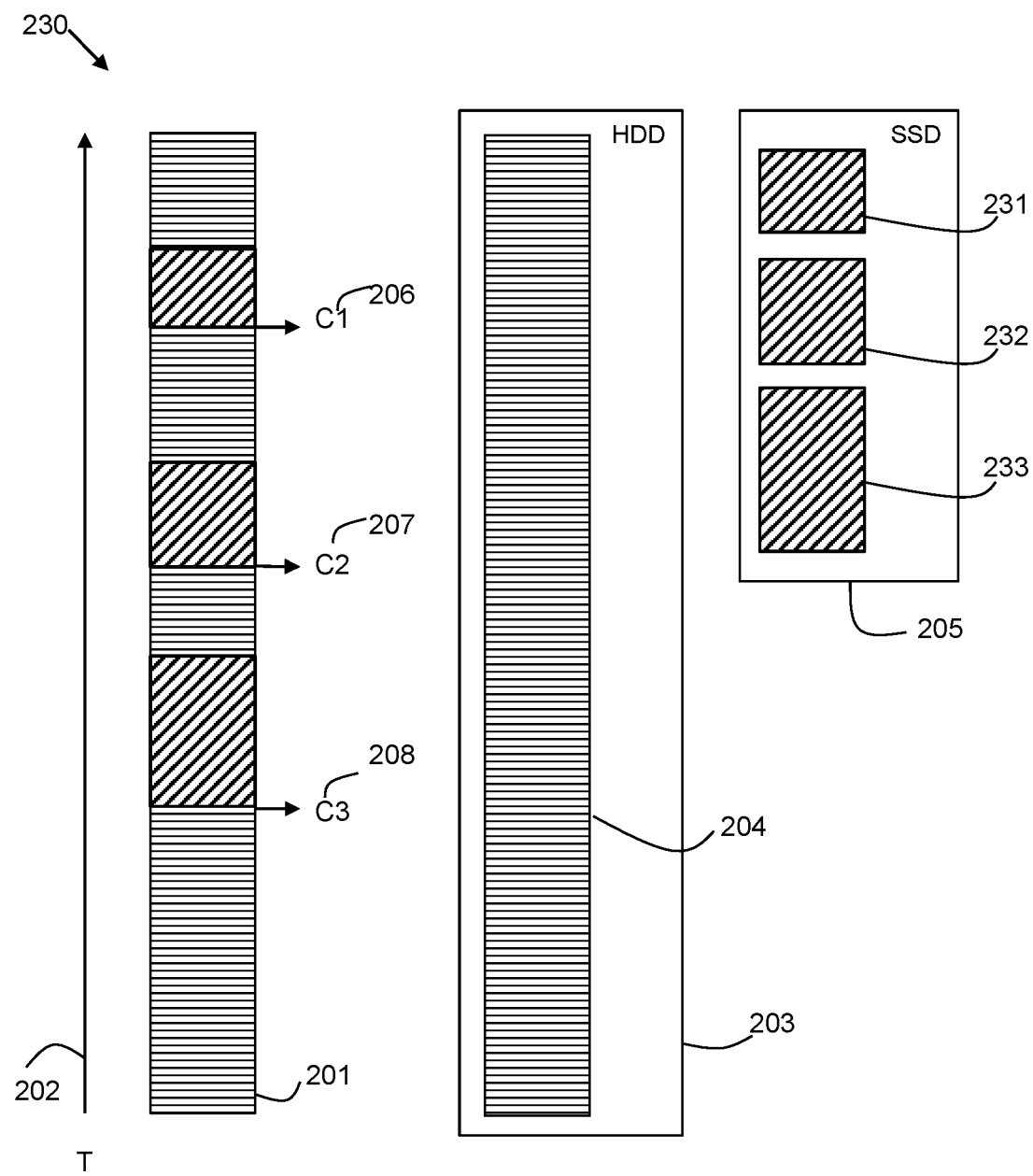

FIGS. 2A to 2C illustrate some example embodiments of storage environments 210, 220, 230 of the described method. In each figure, an event stream 201 is shown against a timeline 202 with most recent events at the top of the event stream 201. A first tier storage in the form of HDD storage 203 is shown with the entire event stream 201 stored 204. A second tier storage in the form of SSD storage 205 is shown with selected portions 211, 221-223, 231-233 of the event stream 201 stored based on the advance data required by consumers 206-208.

A first simple embodiment is shown in FIG. 2A, the consumers 206-208 are all currently reading from positions within the newest entries in the event stream 201. When an event is published to the event stream it is stored within the HDD 203 and the SSD 205. The SSD 205 is populated with the most recent events 211 because these are the advance events required by the consumers 206-208. Access to the stream for the existing consumers 206-208 will be using the SSD 205.

As the number of consumers increases, the probability of the SSD being able to hold all the advance events for all consumers decreases. In this case, there are a number of strategies that may be applied.

FIG. 2B shows a second embodiment in which individual consumer coverage is used as the basis for the SSD allocation. The storage of the SSD 205 is used to cover a proportion of the advance events for each consumer 206-208; however, the entire future stream of events is not stored in SSD.

In FIG. 2B, each consumer has an equal share 221-223 of their future events stored in SSD 205. The amount stored in SSD for each consumer may be based on one or many of the following factors.

It may be based on a static size of storage for each consumer or it may be based on a static number of events for each consumer. Alternatively, it may be based on a dynamic size of storage or number of events depending on the number of consumers. If more consumers start to consume the event stream 201, the size of the portions 221-223 stored in SSD 205 for each consumer may decrease.

FIG. 2C, shows a third embodiment in which the concept is extended so that the size of the portions 231-233 for each consumer varies based on the behavior of each of the consumers. The factors of the behavior may include a speed the consumer is processing events. The factors of the behavior may include the number of events a consumer is behind the head of the stream as this will affect the number of consumers that need access to that data in the future.

In a further embodiment, the method may optimize the SSD storage for a cluster or proportion of consumers instead of all existing consumers. This may allow consumers who are behind the head of the stream, quick storage access so they can catch-up. This may alternatively, maximize the benefit of the SSD for median consumers. In this context the median consumers are those that are statistically clustered together.

One further factor to take into account is that new consumers may start reading from the very beginning of the stored event stream history. Optimizing for consumers being at different points of the event stream in this way should have benefits throughout the lifetime of the event stream.

The described approach relies on knowing where the consumer is going to read next and does not assume the same data is accessed repeatedly. The method does not rely on how often someone is accessing data because there are likely to be consumers reading forwards through a stream to parse events.

The method provides a view on where a consumer is in the stream and considers the actual position of the next pointer to indicate what is likely to be read next. The described method covers this by knowing the index consumers are currently working at. Optionally, read speed and other parameters are used to determine how fast a consumer is moving forward to allocate an appropriate amount of storage for the consumer. The method may also consider how a set of consumers are working to balance what gets onto a hot tier across these consumers.

The method takes an ordered stream of events and optimizes the read time for the events in that stream that a consumer or set of consumers are likely to care about without changing the ordering of the stream itself.

Figure 3:
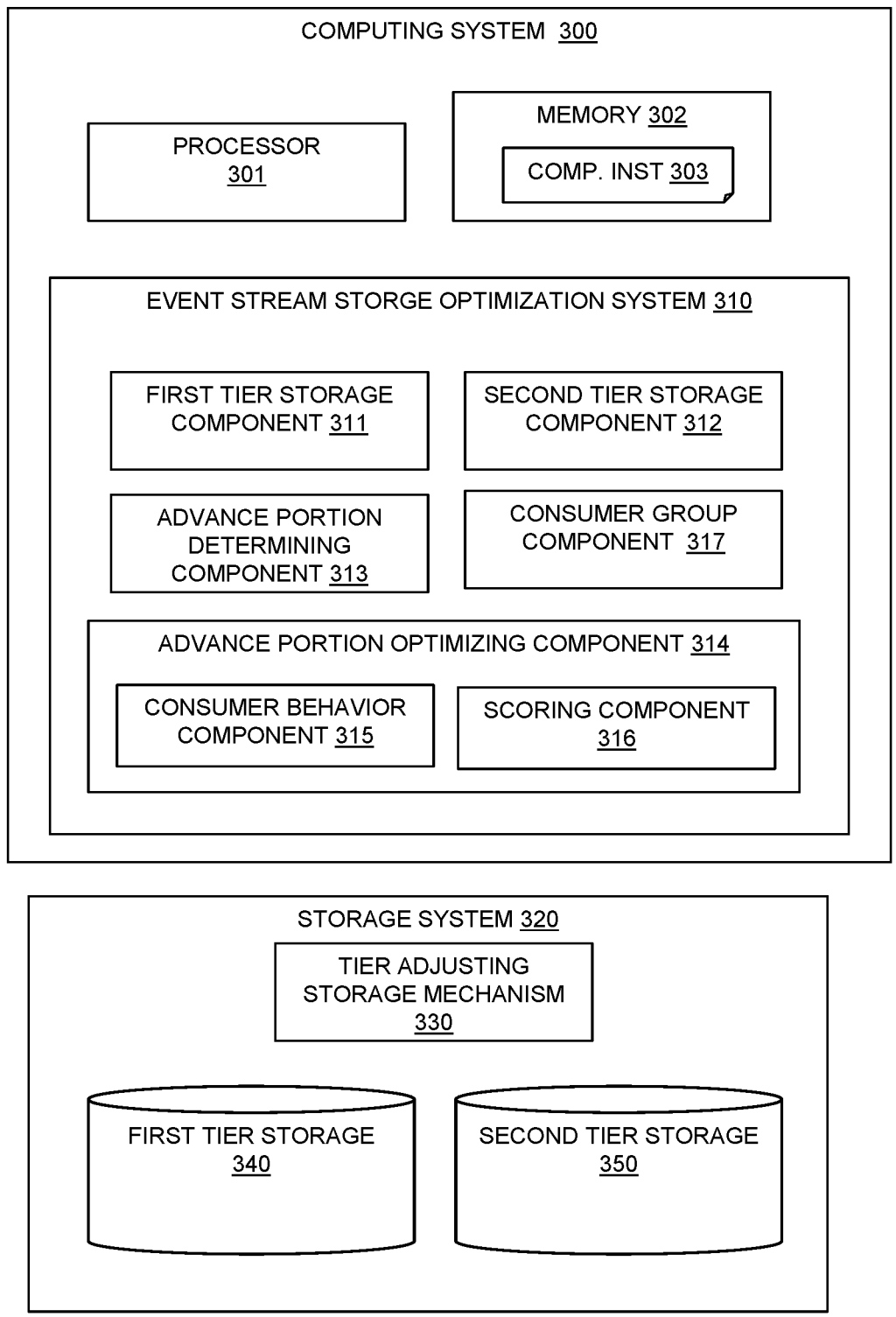
FIG. 3 is block diagram of an example embodiment of a system in accordance with the present invention.

Referring to FIG. 3, a block diagram shows a computing system 300 in which the described event stream storage optimization system 310 is provided. The computing system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

A storage system 320 may be provided with at least first and second tier storage 340, 350 and a tier adjusting storage mechanism 330. The first tier storage 340 may be cost-effective storage, such as HDD storage. The second tier storage 350 may be higher performance storage, such as SSD storage.

The event stream storage optimization system 310 includes a first tier storage component 311 for providing an entire event stream for storage in a first tier storage 340 and a second tier storage component 312 for providing dynamically determined advance portions of the event stream for storage in second tier storage 350. The second tier storage component 312 may augment the tier adjusting storage mechanism 330 for the advance portions.

The event stream storage optimization system 310 includes an advance portion determining component 313 for dynamically determining advance portions of the event stream for at least some of the consumers based on a consumer's position index in the event stream.

The event stream storage optimization system 310 includes an advance portion optimizing component 314 for optimizing a size of each advance portion for each consumer or a group of consumers. The advance portion optimizing component 314 may provide an equal size for each consumer based on a number of current consumers. Alternatively, the advance portion optimizing component 314 may include a consumer behavior component 315 for analyzing consumer behavior to optimize the sizes based on the behavior. The consumer behavior component 315 may determine one or more of: a speed that a consumer is processing events; a number of events a consumer is behind the head of the event stream; and a future number of consumers that need access to the advance portion in the future. The advance portion optimizing component 314 may include a scoring component 316 for scoring advance portions for each consumer to select most commonly required portions and to accommodate overlaps of the advance portions across the consumers.

The event stream storage optimization system 310 may include a consumer group component 317 for optimizing each advance portion for a representative proportion of consumers or a group for which it is determined optimization is required.

Figure 4:
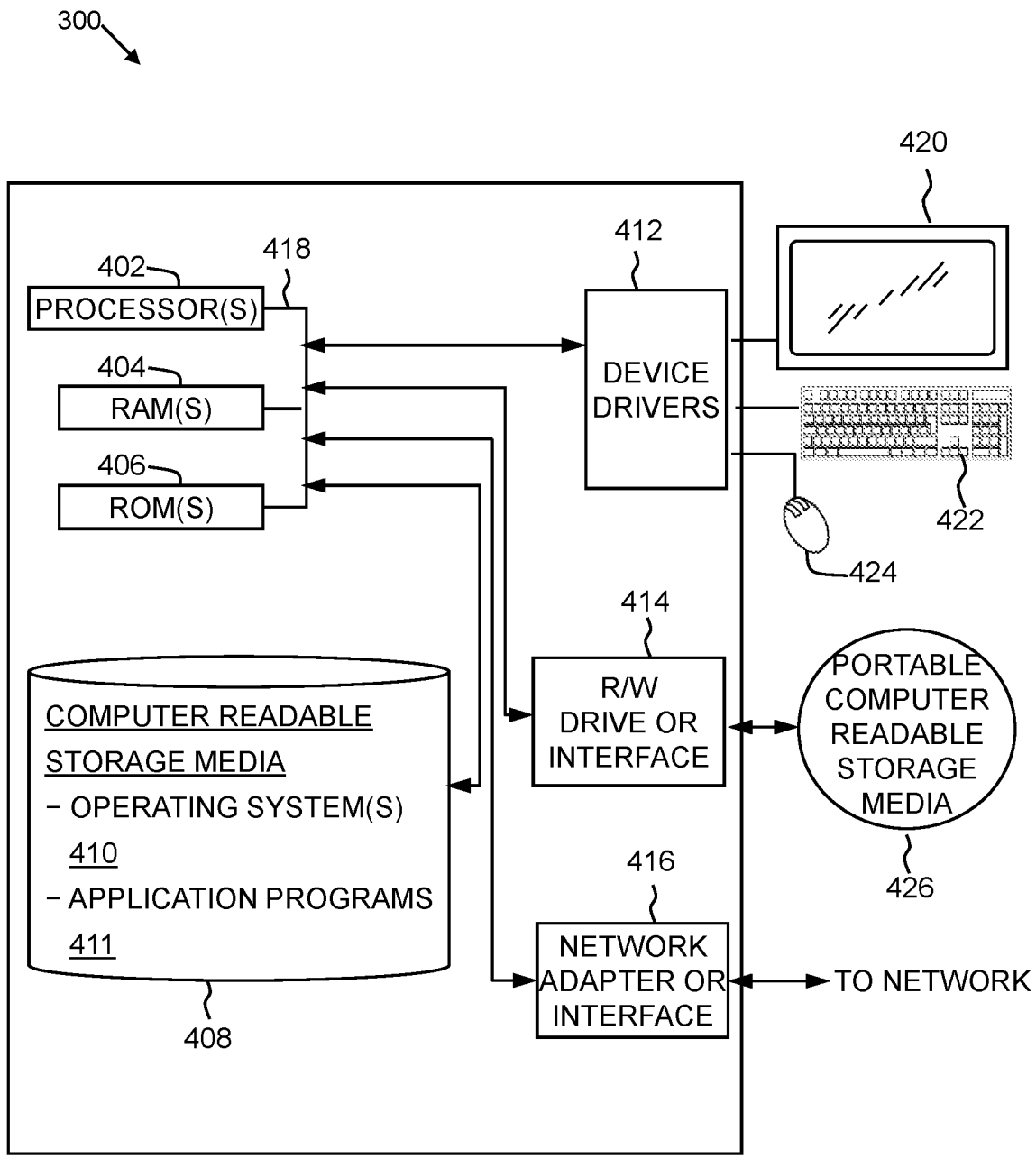
FIG. 4 is a block diagram of an embodiment of a computer system or cloud server in which the present invention may be implemented.

FIG. 4 depicts a block diagram of components of a computing system 300 as used for event stream storage optimization system 310, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The computing system can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the event stream storage optimization system 310 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a RAY drive or interface 414 to read from and write to one or more portable computer readable storage media 426. Application programs 411 on the computing system can be stored on one or more of the portable computer readable storage media 426, read via the respective RAY drive or interface 414 and loaded into the respective computer readable storage media 408.

The computing system can also include a network adapter or interface 416, such as a TCP/IP adapter card or wireless communication adapter. Application programs 411 on the computing system can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

The computing system can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
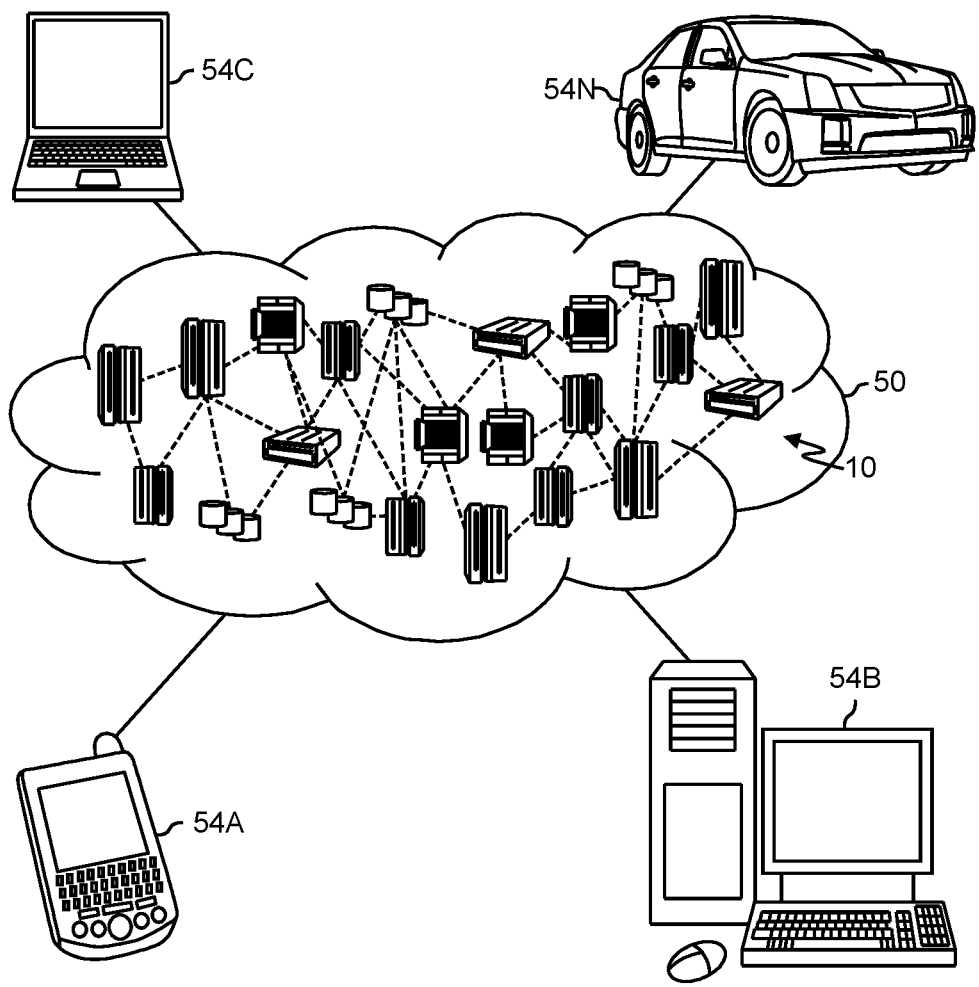
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
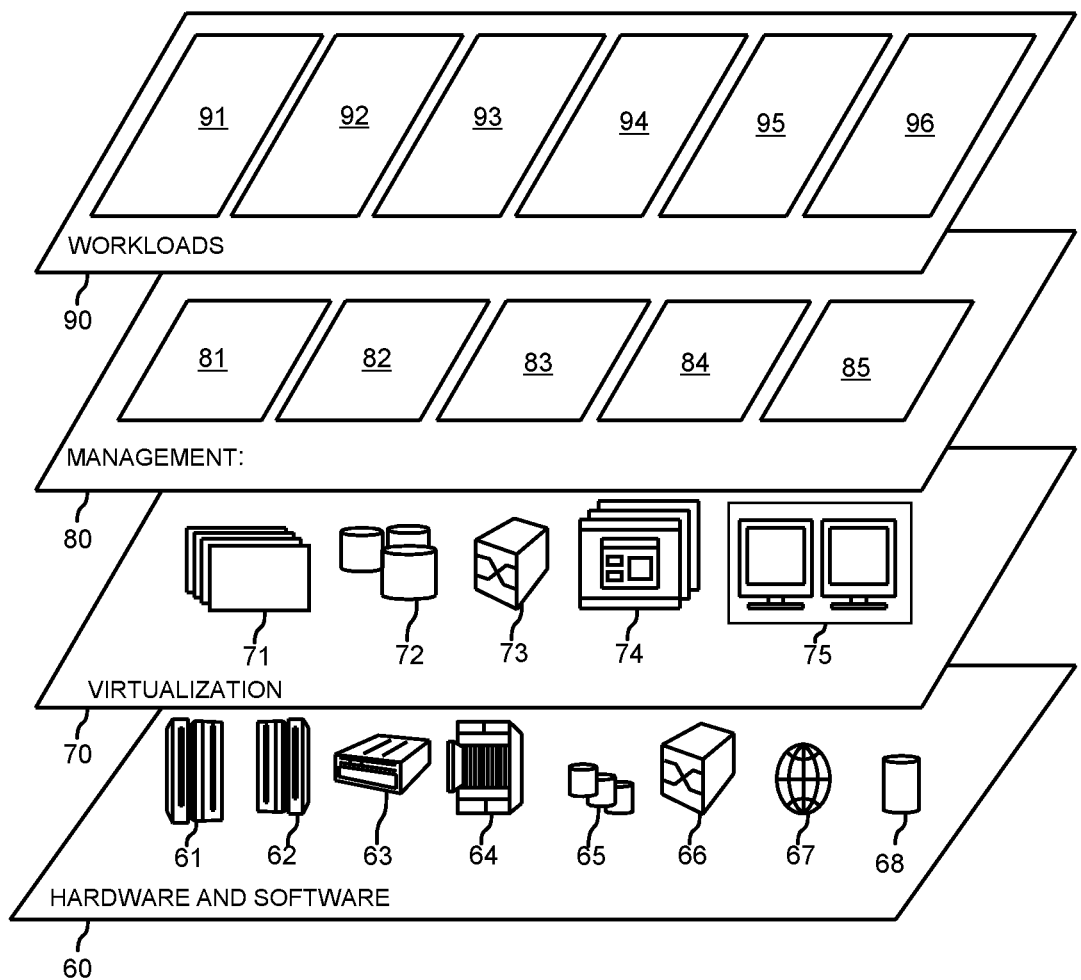
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event stream storage optimization processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for storage optimization for event streaming for multiple consumers, comprising:
   providing an entire event stream for storage in a first tier storage;
   dynamically determining advance portions of the event stream for at least some of the consumers based on a consumer's position index in the event stream, wherein advance portions are portions of the event stream that will be consumed next by the consumer;
   optimizing a size of each advance portion for each consumer or a group of consumers, the size of each advance portion defining a number of events to be stored on an allocated volume of storage, wherein optimizing the size of each advance portion for each consumer or a group of consumers includes analyzing consumer behavior and a number of events a consumer is behind a head of the event stream to increase the size of each advance portion; and
   providing the dynamically determined advance portions of the event stream for storage in a second tier storage that has a higher performance than the first tier storage.

2. The method as claimed in claim 1, wherein optimizing the size of each advance portion further comprises:
   determining a speed that a consumer is processing events and optimizing a greater size of advance portion for a consumer with a higher speed compared to other consumers.

3. The method as claimed in claim 1, wherein optimizing the size of each advance portion further comprises:
   determining a future number of consumers that need access to the advance portion in the future.

4. The method as claimed in claim 1, further comprising:
   scoring advance portions for the consumers to select the most frequently required advance portions and to accommodate overlaps of the advance portions across the consumers.

5. The method as claimed in claim 1, further comprising:
   optimizing each advance portion for a representative proportion of consumers or a group for which it is determined optimization is required.

6. The method as claimed in claim 1, wherein providing the dynamically determined advance portions of the event stream for storage in second tier storage augments a tier adjusting storage mechanism for the advance portions.

7. A system for storage optimization for event streaming for multiple consumers, comprising:
   one or more computer processors, one or more computer-readable storage media, and program instructions stored on the one or more of the computer-readable storage media for execution by at least one of the one or more processors, the program instructions causing the at least one of the one or more processors to execute:
   providing an entire event stream for storage in a first tier storage;
   dynamically determining advance portions of the event stream for at least some of the consumers based on a consumer's position index in the event stream, wherein advance portions are portions of the event stream that will be consumed next by the consumer;
   optimizing a size of each advance portion for each consumer or a group of consumers, the size of each advance portion defining a number of events to be stored on an allocated volume of storage, wherein optimizing the size of each advance portion for each consumer or a group of consumers includes analyzing consumer behavior and a number of events a consumer is behind a head of the event stream to increase the size of each advance portion; and
   providing the dynamically determined advance portions of the event stream for storage in second tier storage that has a higher performance than the first tier storage.

8. The system as claimed in claim 7, wherein optimizing the size of each advance portion further comprises:
   determining a speed that a consumer is processing events and optimizing a greater size of advance portion for a consumer with a higher speed compared to other consumers; and
   determining a future number of consumers that need access to the advance portion in the future.

9. The system as claimed in claim 7, further comprising:
   scoring advance portions for the consumers to select the most frequently required advance portions and to accommodate overlaps of the advance portions across the consumers.

10. The system as claimed in claim 7, further comprising:
    optimizing each advance portion for a representative proportion of consumers or a group for which it is determined optimization is required.

11. The system as claimed in claim 7, wherein providing the dynamically determined advance portions of the event stream for storage in second tier storage augments a tier adjusting storage mechanism for the advance portions.

12. The system as claimed in claim 7, wherein the first tier of storage is provided by hard disk drives (HDD) and the second tier of storage is provided by solid-state drives (SSD).

13. A computer program product for storage optimization for event streaming for multiple consumers, the computer program product comprising a computer readable storage medium having program instructions embodied therewith, the program instructions executable by a processor to cause the processor to:
    provide an entire event stream for storage in a first tier storage;
    dynamically determine advance portions of the event stream for at least some of the consumers based on a consumer's position index in the event stream, wherein advance portions are portions of the event stream that will be consumed next by the consumer;
    optimize a size of each advance portion for each consumer or a group of consumers, the size of each advance portion defining a number of events to be stored on an allocated volume of storage, wherein optimizing the size of each advance portion for each consumer or a group of consumers includes analyzing consumer behavior and a number of events a consumer is behind a head of the event stream to increase the size of each advance portion; and
    provide the dynamically determined advance portions of the event stream for storage in second tier storage that has a higher performance than the first tier storage.

* * * * *